Jan. 21, 1958    F. G. KELLY    2,820,948
ELECTRICAL INSTRUMENTS
Filed July 16, 1952
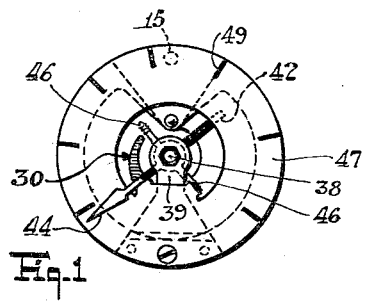
Fig. 1
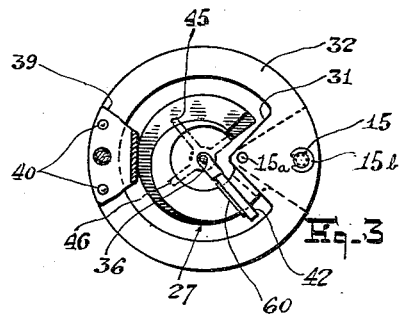
Fig. 3
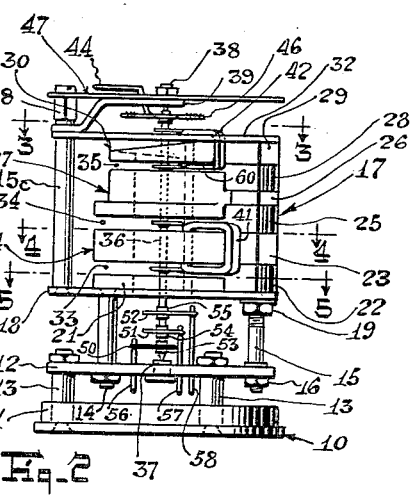
Fig. 2
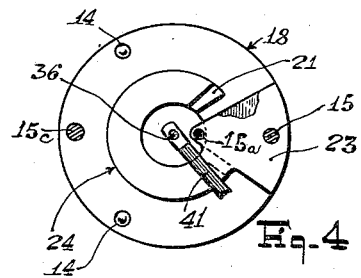
Fig. 4
Fig. 5
Fig. 6
Fig. 7
INVENTOR
Frederick G. Kelly
BY
George H. Fritzinger

United States Patent Office 2,820,948
Patented Jan. 21, 1958

2,820,948

ELECTRICAL INSTRUMENTS

Frederick G. Kelly, West Orange, N. J., assignor, by mesne assignments, to McGraw-Edison Company, Elgin, Ill., a corporation of Delaware Application July 16, 1952, Serial No. 299,133

9 Claims. (Cl. 324—150)

This invention relates to improved electrical instruments, and to novel torque biasing arrangements for the moving armatures of electrical instruments. More particularly, the invention relates to novel forms of moving coil instruments of the ratiometer type. Although the torque biasing feature of my invention is particularly adapted for use in instruments having armatures of the moving coil type, no unnecessary limitation of this feature to such instruments is intended.

Objects of my invention are to provide new and improved magnet structures for moving coil instruments and especially for such instruments of the ratiometer type; and to provide a novel torque biasing arrangement useful in electrical instruments generally and adapted especially for instruments having moving coil armatures.

Another object is to provide a novel and improved torque biasing device suitable especially for long scale instruments having a deflection range greater than 180°.

Another object is to provide a torque biasing arrangement for electrical instruments which produces a nearly constant bias torque on the armature throughout its operative range.

Further objects of my invention are to provide a novel moving coil ratiometer which is characterized as having a substantially uniform scale and a high efficiency enabling accurate measurement of the ratios of relatively small currents.

This invention is adapted especially to fulfill the industrial need for a practical ratiometer of the long scale variety which will measure accurately under conditions of heavy vibration, wide temperature changes, and wide variations in voltage supply to the measuring system, such as are typical in aircraft applications. Features of my invention which enable accurate measurements under these conditions reside in the attainment of a higher driving torque than has been heretofore commercially obtained in long scale ratiometer instruments, and in providing a novel torque biasing device for such instruments which subjects the armature to a minimum required bias torque throughout the operating range.

In ratiometer instruments the moving armature is actuated by two opposing torques which depend on respective coil currents whose ratio is under measurement. The relative torque deflection characteristics for these coils are such that for given coil currents the effective actuating torque on the armature varies with deflection thereof. Under these conditions the armature is propelled always to an indicating position whereat the opposing torques are in balance. If the armature is deflected physically from an indicating position, the torque exerted in the direction of such deflection is reduced and that in the other direction is increased to restore the armature to its original position, the effective restoring torque being dependent upon the amount of deflection of the armature from an indicating position. In ratiometer instruments having substantially uniform scales, the restoring torque varies substantially uniformly with deflection from any indicating position of the armature in its operating range.

Ratiometers are used typically in bridge circuits which when energized produce variations in the ratio of two currents according to changes in a condition to be measured. When the ratiometer circuit is not energized— as when the system is not in use—the actuating torque on the armature is nil and the armature tends to drift. To prevent such drift, and the possibility of erroneous readings, the armature is subjected to a biasing torque to return it to zero position on the scale when energization of the instrument is removed. In long scale instruments torsion springs are generally used for this purpose. Torsion springs are however not very satisfactory for ratiometer-type instruments. This is because the spring must be strong enough to meet maximum return requirements near the zero point on the scale and will then, in view of its rising torque characteristic with deflection, provide an excess torque bias throughout the remaining portion of the scale. Wherever the torque bias is excessive, errors in meter indications may be serious. If the restoring torque at successive points along the scale varies according to some fixed characteristic the error might be eliminated in calibrating the instrument, but this is not possible with ratiometers because here the restoring torque varies with changes in supply voltage. When the meter is indicating at a point on the scale whereat the torque bias is excessive, the indication may shift appreciably with changing supply voltage, but at indicating positions whereat the torque bias is at a minimum, the shift may be negligible. Also, when the torque bias characteristic does not match the restoring torque characteristic there will be a greater shift in indication with changing supply voltage at some points on the scale than at others. However, when the torque bias is uniform and at a minimum value throughout the operating range of the armature, as in accordance with my invention, there is no excess torque bias to produce unnecessary error in the indications of the instrument. Also, a constant torque bias throughout the operating range matches the restoring torque characteristic of instruments having uniform scales to keep at a minimum the indicating errors which may arise from changes in supply voltage.

These and other objects and features of my invention will be apparent from the following description and the appended claims.

In the description of my invention reference is had to the accompanying drawings, of which:

Figure 1 is an end view of a ratiometer instrument incorporating my invention;

Figure 2 is a side elevation of this instrument;

Figures 3, 4 and 5 are sections taken respectively on the lines 3—3, 4—4 and 5—5 of Figure 2;

Figure 6 is a fractional perspective view showing a portion of the armature system of the present instrument; and Figure 7 is a typical bridge circuit for the present instrument.

Only by way of example, the frame structure of the present instrument is shown as comprising a circular end wall 10 provided with a circular flange 11 inset from the peripheral edge of the end wall for engaging the rim portion of a cylindrical casing not shown. This end wall carries, in spaced relation to the inner side thereof, a circular frame plate 12 which is supported on studs 13 projecting from the end wall. Mounted on the inner side of this frame plate are three equally spaced studs comprising two spacing posts 14 and a stud bolt 15, all having threaded end portions passing through the frame plate and secured thereto by nuts 16. These latter studs carry a cylindrical magnetic assembly 17 herein next described.

The magnetic assembly 17 comprises a circular end plate 18 which is riveted to the spacing posts 14 and secured to the stud bolt 15 by a nut 19 as is hereinafter more fully explained. This plate 18 has a center hole 20. Mounted on this plate is a C-shaped pole member 21 (Figure 5) which is concentric with the center hole 20. Also mounted on this plate in spaced symmetrical relation with the open ends of the C-shaped pole member 21 is a sector-shaped permanent magnet 22. This permanent magnet is the end member of a stack of sector-shaped magnets and sector-shaped base portions of pole members constituting the magnetic stator structure of the present instrument. For instance, these stacked members comprise in succession the magnet 22, base end portion 23 of a hook-shaped pole member 24 (Figure 4), permanent magnet 25, base end portion 26 of hook-shaped pole member 27, permanent magnet 28, base end portion 29 of hook-shaped pole member 30, and sector-shaped portion 31 of a circular frame plate 32. The stacked portions of these members are all sector shaped and are clamped tightly together by a rivet 15a and by the aforementioned stud bolt 15, the clamping pressure of the stud bolt being effected between the head thereof and the nut 19. For easing the assembling of the instrument, the head of the stud bolt 15 is formed by a removable spring clip 15b. For rigidifying the stacked assembly, a spacing post 15c is riveted between the plates 18 and 32 at a point diametrically opposite the stud bolt 15 (Figure 2).

The pole members are so arranged that the arcuate portions thereof are aligned on a common axis in spaced overlapping relation to each other to provide arcuate air gaps 33, 34 and 35 therebetween which have uniform length in directions of the flux between the members (alternatively, according to my invention, the pole members and magnets may be arranged concentrically in a common plane, with the magnets being interposed between the base portions of the pole members, as will be apparent). In order that the lengths of the air gaps 33, 34 and 35 may be less than the lengths of the magnets 22, 25 and 28, the pole members 21 and 27 are stepped in relation to their base portions—i. e., in the specific instance, the arcuate portions of the pole members are made much thicker than the base portions which are clamped against the magnets—as is disclosed in my pending application Serial No. 74,820, filed February 5, 1949 (now Patent No. 2,660,707 dated November 24, 1953), and having common ownership with the present application.

To aid in the proper relative positioning of the pole members and magnets, the opposite faces thereof are ground flat in parallel relation to each other. The permanent magnets are preferably made of one of the efficient nickel, iron, aluminum, cobalt alloys known as "Alnico." The plate 18 and pole members 21, 24, 27 and 30 are all made either of annealed mild steel, substantially pure iron or other magnetic materials having high permeability and high saturation value so that these members will have substantially constant magnetomotive force along the arcuate lengths thereof.

The moving armature of the present instrument comprises a spindle 36 at the axis of the pole members journaled in a suitable bearing 37 mounted on the bottom of the end plate 12 and in another bearing 38 mounted on an arm 39 which is riveted at 40 (Figure 1) to the top plate 32. This spindle carries two coils 41 and 42 positioned in a common plane at one side thereof. These coils embrace respectively the pole members 24 and 30. Because of the relatively large size of the center openings in the pole members, these coils are offset from the spindle and secured thereto by means of a bail 43 shown in Figure 6. The coils have suitable clearance spacing from their respective pole members to permit free pivotal movement along the arcuate lengths thereof about the center axis. A pointer 44, which is mounted at the upper end of the spindle, is positioned in the plane of the coils but directed 180° therefrom to counteract the unbalancing effect of the coils. This pointer has the usual balancing cross comprising one arm 45 extending in the direction of the pointer and two side arms 46, all of which are provided with adjustable weights for fine balancing. A circular dial 47 is mounted on a stud 48 which projects upwardly from the post 15c. The dial has a center opening through which passes the pointer 44, and carries a scale 49 with which the pointer registers. Three current connections are made to the armature coils 41 and 42, one of which is common to the two coils. These connections are made through respective hair springs 50, 51 and 52. The hair springs are connected at their inner ends to respective insulated metal bushings 53, 54 and 55 mounted on the spindle. These bushings also serve as terminals for wires (not shown) which lead to the coils. The outer ends of the springs are anchored to respective terminals 56, 57 and 58 which are insulatedly mounted on the plate 12. These hair springs are made very light so that they have negligible torque biasing effect on the armature.

In a ratiometer it is desired that the actuating torque exerted on at least one of the armature coils, for a given current therein, shall vary linearly with deflection for if the actuating torque on the other coil varies similarly, or is constant with deflection, the instrument will have a uniform scale. An equation expressing the developed torque on each coil is $$T = KNI\frac{d\phi}{d\theta}$$

where T is the developed torque, K is the constant, N is the number of turns in the armature coil, I is the current in the coil, $\phi$ is the magnet flux linking the armature coil, and $\theta$ is the angular deflection of the armature coil. It follows from this equation that to obtain a torque which varies linearly with deflection, or which in other words is proportional to $\theta$, the flux linking the armature coil should be proportional to $\theta^2$.

In order to obtain the flux linkage with the coil 42 which varies by a square law, the pole member 30 embraced by this coil is tapered in both its radial (width) and axial (thickness) dimensions from a maximum at its base end to a minimum at its free end; and the confronting portion of the pole member 27 is tapered in its radial dimension in correspondence with that of the pole member 30. The tapering of the pole members 27 and 30 in their radial dimensions causes the straight-line flux between the confronting faces of these members to vary along the arcuate lengths of the members according to the variation in the widths thereof, assuming that the pole members havve uniform magnetomotive force therealong and that the air gap 35 therebetween has uniform length as was hereinbefore described. However, there is an additional flux between the pole members along the lengths thereof known as fringe flux. This flux spreads out from the edges and side walls of the pole members. If the side walls of these members were uniform along the lengths thereof the fringe flux component would be substantially uniform. In order though that this fringe flux component will vary along the pole members in the manner of the straight-line flux, the pole member 30 is tapered in its axial dimension as abovementioned. To a first approximation a uniform tapering of the pole members 27 and 30 in their radial dimensions will cause a uniform rate of change of linkage of the straight-line flux with the coil 42 with deflection, and a uniform tapering of the pole member 30 in its axial dimension will cause a uniform rate of change in linkage of the fringe flux of this coil with deflection. When there occurs such uniform rate of change of linkage of the total flux of the coil with deflection—i. e., when $$\frac{d\phi}{d\theta}$$

is proportional to $\theta$—then the total flux linkage vs. deflection is a square law or quadratic characteristic. There are however end effects which require some accentuation in the tapering of the pole members 27 and 30 at their base and free ends in order to realize the desired square law characteristic throughout the entire operating range of the armature coil 42. These end effects are due at least in part to the stray fields produced by the permanent magnet 28.

The torque vs. deflection characteristic chosen for the armature coil 41 is one which is substantially constant, for a given current therein, throughout the entire operating range. To obtain such a characteristic it is required that the total flux linkage with the coil 41 vary linearly with angular deflection for then the derivative $$\frac{d\phi}{d\theta}$$

will be a constant to cause the torque to be constant for a given coil current. To this end the confronting portions of the pole members 24 and 27 are made uniforms both in their radial and axial dimensions and, likewise, the confronting portions of the pole members 24 and 22 are made uniform in both their radial and axial dimensions.

A typical circuit for the present ratiometer is shown in Figure 7. Herein, the resistors 61, 62, 63 and 64 comprise a Wheatstone bridge which is connected across a source of voltage 65 through an on-off switch 66. All of the bridge resistors are fixed except the resistor 61; this resistor is varied according to a condition under measurement. This variable resistor may for instance be a temperature resistance bulb having a high temperature coefficient of resistance, in which case the scale of the instrument would be calibrated in terms of temperature. The coil 41 is connected diagonally across the bridge and the coil 42 is connected in a fixed branch 63—64 of the bridge. Coil 42 is preferably shunted by a resistor 67 for purposes of aiding the calibrating of the instrument and the compensating of the instrument for temperature variations. The current in the coil 41 varies according to changes in resistor 61 and in the supply voltage, but the current in the coil 42 varies only with changes in the supply voltage. In this arrangement, the coil 41 may be thought of as a galvanometer coil inasmuch as it is energized only by small currents dependent principally on the degree of unbalance of the bridge. On the other hand, the coil 42—which has a torque characteristic that varies linearly with deflection—operates like a hair spring of a D'Arsonval meter but with a torque dependent on the supply voltage. For maximum sensitivity of the galvanometer coil 41, two legs thereof are placed in magnetic fields, the fields in the gaps 33 and 34. Since relatively large currents will flow through the coil 42 in the circuit arrangement of Figure 7, there is wide latitude for tapering the pole member 30 associated with this coil while yet producing sufficient actuating torque. In order that the torque exerted on the opposite legs of the coil 41 will be additive, the magnets 22 and 25 are poled oppositely to cause the flux produced thereby to be additive in the pole member 24. On the other hand, the magnets 25 and 28 are purposely poled additively to each other so that the flux produced thereby in the pole member 27 will tend to balance out; this permits a reduction in the cross sectional area of this pole member.

By way of typical example, the resistance of coil 42 may be 100 ohms and that of coil 41 may be 180 ohms. I find that 1 ma. current in the galvanometer coil 41 will produce a torque of 90 mg. cm. per 100° deflection.

As so far described, the armature would tend to drift whenever the coils 41 and 42 are not energized. This would be undesirable since a drift reading may be erroneously interpreted as a true indication of the condition being measured. It is therefore important that the armature be returned to zero position on the scale when energization of the instrument is removed. For simplification purposes, it is desirable that the armature be subjected continuously to the biasing torque necessary to effect such return. A continuous biasing torque will produce minimum error in the meter indications, especially in a ratiometer having a substantially uniform scale, if the biasing torque is substantially uniform throughout the scale range, as hereinbefore explained. I have found that a uniform biasing torque can be produced very simply throughout a long-scale range of the order of 270°. This is accomplished especially easily in moving coil instruments having tapered pole members. For instance, the only additional apparatus required is a thin magnetic bar 60 that is mounted on the armature in the air gap 35 between the tapered pole members 27 and 30. This magnetic bar extends crosswise of the gap 35, preferably on a radius line of the instrument, and is mounted conveniently on the leg of the coil 42 which is in this gap, as shown in Figure 6. The bar may be either a permanent magnet or a piece of highly permeable magnetic material such as substantially pure nickel. Preferably a bar of substantially pure iron having dimensions of .001" x .020" in cross section and a length equal to span the maximum width of the gap 35 is employed. Such a bar will produce a biasing torque of the order of 2 mg. cm. per 100° deflection. Since this biasing torque is substantially constant throughout the scale range, there is realized the condition for assuring return of the armature, as when the switch 66 is open, with a minimum biasing torque at all points on the scale.

The present torque-biasing arrangement is of a change-of-reluctance type. In other words, since the pole members 27 and 30, between which the magnetic bar 60 is carried, are tapered, the magnetic bar seeks a position wherein the reluctance of the magnetic circuits between it and these pole members is a minimum. This position is one at the base portions of the pole members since at this position the pole members have maximum overlap with the magnetic bar.

By changing the shape of the magnetic bar 60, the shape of the biasing torque vs. deflection characteristic can be varied. For instance, a magnetic bar having a trapezoidal shape, say one having a width of .020" at one end and a width of .030" at the other end, and so placed that the narrower end thereof lies between the tapered pole members 27 and 30 when the armature is at the free end of these pole members, will produce a biasing torque which, with respect to that of a uniform bar, will rise as the armature moves toward the base portions of the pole members. This is because the reluctance between such trapezoidal bar and the pole members 27 and 30 will decrease at a faster rate, than will that of a uniform bar, as the wider portion of the trapezoidal bar comes into the gap 35 at the base ends of the pole members.

It is believed that the features of my invention will be apparent from the foregoing description taken in connection with the specific embodiment shown in the accompanying drawing. It will be understood that the particular embodiment herein shown is intended to be illustrative and not necessarily limitative since this embodiment is subject to many changes and modifications without departure from the scope of my invention, which I endeavor to express according to the following claims.

I claim:

1. An electrical instrument comprising two arcuately-shaped pole members of magnetically-permeable material having substantially equal radii of curvature and each being less than 360° in length; a permanent magnet connected to base portions of said pole members to produce a flux between the arcuate portions thereof; means connecting said pole members and magnet into a permanent structure wherein the pole members are held on a common axis and equally spaced from each other to provide an air gap of uniform length therebetween, said pole members having substantially uniform magnetomotive force therealong to provide substantially uniform flux density in said gap, the confronting faces of both of said members having width dimensions varying from a maximum at the base portions thereof to a minimum at the free end portions thereof, said variation being substantially uniform throughout the central portions of said pole members and being accentuated at the end portions thereof, and one of said pole members being tapered substantially uniformly in its dimension along said axis to cause the fringe flux from the side walls thereof to decrease along the arcuate lengths of said pole members proceeding toward the free ends thereof; and an armature coil surrounding one of said pole members and pivoted at said axis for movement along the pole members.

2. A ratiometer comprising three arcuate pole members of magnetically-permeable material held in fixed arrangement on a common axis and spaced from each other to form two arcuate air gaps therebetween having uniform lengths along said pole members; two permanent magnets connected between the center one of said pole members and the outer pole members respectively, said magnets being poled to cause a balancing out of flux in the center pole member; and armature coils surrounding said outer pole members respectively and pivoted at said common axis for unison movement along pole members.

3. A ratiometer comprising three arcuate pole members of magnetically-permeable material held in fixed arrangement on a common axis and spaced from each other to form two arcuate air gaps therebetween having uniform lengths along said pole members; two permanent magnets connected between the center one of said pole members and the outer pole members respectively, said center pole member having opposite portions of different formation confronting respectively said outer pole members one of said outer pole members and said center pole member having confronting faces of uniform width and having effectively uniform side walls extending from said faces whereby the flux between said pole members is uniform along the lengths thereof, and the other outer one of said pole members and said center pole member having confronting faces whose widths are tapered from a maximum at their base portions to a minimum at their free end portions.

4. A ratiometer comprising first, second and third arcuate pole members of magnetically-permeable material arranged successively in spaced axial relationship to provide uniform air gaps therebetween; two permanent magnets operatively interposed between adjacent pairs of said pole members respectively to provide magnetic flux in said air gaps; an armature comprising a spindle at the axis of said pole members and first and second coils mounted on said spindle and surrounding respectively the first and third ones of said pole members, said first pole member being tapered both in its radial and axial dimensions from its base portion to its free end portion to cause the flux linkage with said first coil with deflection thereof to vary substantially by a square law whereby the torque exerted on said first coil, for a given current therein, will vary substantially linearly with deflection of the coil; the second of said pole members comprising an integral structure having one portion confronting said first pole member which is tapered in its radial dimension in correspondence with that of said first pole member and having another portion confronting said third pole member having uniform width along the arcuate length thereof, said third pole member having uniform radial and axial dimensions along the length thereof causing the torque on said second coil, for a given current therein, to be substantially constant with deflection of the coil.

5. The ratiometer set forth in claim 4 including a fourth arcuate pole member mounted in spaced axial arrangement with respect to the third of said aforementioned pole members, including a permanent magnet interposed between said third and fourth pole members, wherein the respective magnets between said second and third pole members and between said third and fourth pole members are poled to cause the torque exerted on the opposite legs of said second coil to be additive.

6. An electrical instrument comprising a magnetic structure including two arcuate magnetic members arranged on a common axis and spaced from each other to form arcuate air gaps of uniform length therebetween, said members being magnetized to provide a magnetic flux in said gap, an armature coil surrounding one of said magnetic members and pivoted at said axis for arcuate movement through an operative range along said members, at least one of said members being tapered to cause the rate of change of flux linkage with said coil to vary with deflection of said coil, and a thin bar of magnetic material carried with said coil in said gap for exerting continuously a biasing torque on said armature coil at all positions thereof in its operative range.

7. The instrument set forth in claim 6 wherein said magnetic members are adapted to produce a flux therebetween having a linkage with said coil which varies substantially by a square law with deflection of said coil, and wherein said magnetic bar is positioned relative to said magnetic members to produce a substantially uniform torque bias on said coil throughout its said operative range.

8. An electrical instrument comprising two coaxial arcuate magnetic pole members of permeable magnetic material having substantially equal radii of curvature and coaxially arranged in spaced relation to provide an arcuate air gap of uniform length therebetween; a permanent magnet interposed between base portions of said pole members to produce a flux in said air gap; a coil surrounding one only of said pole members and pivoted at the axis thereof for movement therealong, at least one of said pole members being tapered; and a bar of magnetic material carried with said coil in said air gap and cooperating with said tapered pole member to subject said coil to a biasing torque urging the coil toward the base portions of said pole members.

9. An electrical instrument comprising two arcuate magnetic pole members of permeable magnetic material arranged on a common axis and spaced from each other along said axis to provide an arcuate air gap of uniform length therebetween; a permanent magnet interposed between base portions of said pole members to produce a flux in said air gap, both of said pole members being tapered in their radial dimensions and at least one being tapered also in its axial dimension to cause the flux therebetween to decrease substantially uniformly along said pole members from the base to the free ends thereof; and an armature for said instrument including a bar of permeable magnetic material pivoted at said axis for movement along the pole members, said bar being positioned in said gap to cause the magnetic coupling thereof with said pole members to have a varying reluctance as said armature is moved through its operative range whereby a torque bias is produced on said armature.

References Cited in the file of this patent

UNITED STATES PATENTS

| Number | Name | Date |
| --- | --- | --- |
| 1,171,907 | Trent | Feb. 15, 1916 |
| 1,515,634 | Vawter | Nov. 18, 1924 |
| 2,308,341 | Rowell | Jan. 12, 1943 |
| 2,400,308 | Klepp | May 14, 1946 |
| 2,401,160 | Jewell | May 28, 1946 |
| 2,409,866 | Jewell | Oct. 22, 1946 |
| 2,457,685 | Klepp | Dec. 28, 1948 |
| 2,586,831 | Knudsen | Feb. 26, 1952 |
| 2,637,761 | Young | May 5, 1953 |

FOREIGN PATENTS

| Number | Country | Date |
| --- | --- | --- |
| 441,908 | Great Britain | Jan. 29, 1936 |
| 456,988 | Great Britain | Nov. 19, 1936 |